United States Patent [19]

Nnadi et al.

[11] 4,083,895

[45] Apr. 11, 1978

[54] MODIFIED BLOCK COPOLYMERS AND PROCESS OF PREPARING THE SAME

[75] Inventors: John C. Nnadi, Lagos, Nigeria; Israel J. Heilweil, Princeton, N.J.

[73] Assignee: Mobil Oil Corporation, New York, N.Y.

[21] Appl. No.: 696,104

[22] Filed: Jun. 14, 1976

[51] Int. Cl.$^2$ .................. C08L 9/06; C08L 43/04; C10M 1/40

[52] U.S. Cl. .................. 260/874; 252/33.4; 252/33.6; 252/42.1; 252/47.5; 252/48.6; 252/49.6; 252/51.5 R; 252/52 A; 252/56 R; 260/827; 260/887

[58] Field of Search .................. 260/874, 827, 887; 252/33.4, 33.6, 42.1, 47.5, 48.6, 49.6, 51.5 R, 52 A, 56 R

[56] References Cited

U.S. PATENT DOCUMENTS

| 3,867,295 | 2/1975 | Schwab et al. | 260/33.4 |
| 3,954,915 | 5/1976 | Schwab et al. | 260/887 |

*Primary Examiner*—Thomas De Benedictis

*Attorney, Agent, or Firm*—Charles A. Huggett; Raymond W. Barclay; Claude E. Setliff

[57] ABSTRACT

Using a novel process of one or more combined steps, modified novel block copolymers are prepared by alkylating or hydrogenating a block copolymer precursor containing at least two segments, in which segment A consists of a styrene polymer, either styrene alone or a hydrogenated random butadiene-styrene copolymer and from 1% to about 50% by weight of segment B being an alkylene oxide or sulfide copolymerized with the first segment as an AB or BAB copolymer. These novel copolymers perform as multifunctional additives in industrial organic compositions, both hydrocarbon fluids, such as petroleum-derived, and non-hydrocarbon, or synthetic fluids, providing such utility as detergency, emulsification and viscosity index improvement. These copolymers have molecular weights in the range of from about 1,000 to 500,000. The copolymers are particularly useful in lubricating oils, greases and fuels, especially cross-graded lubricants, crude oils, diesel oils, gasoline and fuel oils. Copolymers capped with metal diisocyanate have excellent thermal and oxidative stability.

11 Claims, No Drawings

MODIFIED BLOCK COPOLYMERS AND PROCESS OF PREPARING THE SAME

BACKGROUND OF THE INVENTION

1. Field of the Invention

This invention relates to "block copolymers" suitable for use in organic fluid compositions. In particular, this invention relates to block copolymers composed of at least two blocks, fluid compositions containing the same and the processes of preparing copolymers.

2. Description of the Prior Art

U.S. Pat. No. 3,050,511 describes block copolymers obtained from polystyrene and alkylene oxide. The technique involves forming a "living polymer" of the styrene in the presence of an anionic catalyst, then adding the alkylene oxide to it. Such products, however, would not be suitable as hydrocarbon fluid additives because they have insufficient solubility in lubricating oils to retain their effectiveness and they lack suitable terminal groups for thermal and oxidative stability. U.S. Pat. No. 3,219,725 describes a block polymer of oxymethylene and styrene or alpha-methylstyrene by polymerizing styrene and adding formaldehyde to produce a polyoxymethylene block. It is understood that the resulting block copolymer may be terminated by esterification. Olefin oxide, higher aldehydes, isocyanates and the like may replace the styrene. Again, the use of styrene polymer as the first block-forming monomer or replacement by a polar monomer would not produce a useful multifunctional additive for lubricating oils. U.S. Pat. No. 3,281,499 describes block copolymers of oxymethylene and olefins, such as styrene. The resulting products are moldable polymers which are of little solubility in lubricating oils or other organic fluids. U.S. Pat. No. 3,318,813 describes a tert-butylstyrene polymer prepared in an anionic polymerization using n-butyl lithium as the initiator. Polymerization is terminated in methanol. This polymer is said to be useful as a viscosity index (VI) improver. The polymers used in this reference contain no polar groups. Hence, these homopolymers are distinguishable from the copolymers of the present invention. U.S. Pat. No. 3,175,997 claims a process of preparing terminally reactive polymers, such as butadiene-styrene copolymers, by reacting with ethylene oxide and acidifying the alkali metal group to —OH. The products are used in adhesives, potting compounds and binders. U.S. Pat. No. 2,835,658 describes treating styrene-lactone block polymers with diisocyanates. The polymers are elastomers prepared from free-radical bulk polymerization. G. B. Pat. No. 1,304,289 describes hydrogenated butadiene-styrene copolymers as VI improvers. These polymers contain no polar polymer blocks. U.S. Pat. No. 3,867,295 describes block copolymers of the AB or BAB type prepared from alkylstyrene of hydrogenated butadienestyrene and alkylene oxide or sulfide. These products have utility in lubricating oil compositions as VI improvers or detergents.

SUMMARY OF THE INVENTION

Applicants have now discovered novel modified block copolymers of the AB or BAB type prepared from block copolymers in which A is a block of either a styrene-containing polymer, a homopolymer of styrene or alkylstyrene or a hydrogenated copolymer of a diene and styrene or alkylstyrene, and B is a block of a polymer of poly(alkylene-oxide) or poly(alkylene sulfide), wherein the B block may constitute at least 1% and preferably 1% to about 50%, by weight of the copolymer. These copolymers may contain end groups, Z, derived from an organic or inorganic compound capable of reacting with an alkoxide or alcohol. The copolymer precursor is subjected to alkylation or hydrogenation or both. The alkylation step adds an alkyl group to the phenyl ring of the styrene segment. Hydrogenation converts part or all of the phenyl rings to cyclohexlynl or cyclohexyl groups. Organic industrial fluid compositions containing such modified polymers have excellent dispersant and viscosity index characteristics. Lubricants such as automotive lubricating oils, diesel oils, cross-graded oils and greases, and fuels, such as gasoline and fuel oil, are suitable media for these modified polymers.

DESCRIPTION OF SPECIFIC EMBODIMENTS

The copolymer precursor is prepared from styrene or even pre-alkylated styrene or alpha-methyl styrene or hydrogenated diene-styrene polymers and polyalkylene oxide or sulfide. The resulting copolymer is generally of the AB or BAB types. Included in the BAB category are also

and

These block copolymers are described in U.S. Pat. No. 3,867,295. Styrene or a mixture of preferably butadiene and styrene is polymerized by anionic polymerization to form the A block. The initiator for this reaction is an organometal compound of the alkali metal group; lithium, sodium, potassium, cesium and rubidium. The formula for these initiators is $RM_y$, wherein R is organo, mono- or polyvalent and may be alkyl, alkenyl, aryl, aralkyl, and alkaryl, and may contain from 1 to about 50 carbon atoms; and $y$ is 1 to 4, and preferably 1 or 2. Such initiators as methyl lithium, ethyl lithium, methyl sodium, propyl lithium, n-butyl lithium, sec-butyl lithium, tert-butyl lithium, butyl sodium, lithium naphthalene, sodium naphthalene, potassium naphthalene, cesium naphthalene, phenyl sodium, phenyl lithium, benzyl lithium, cumyl sodium, cumyl potassium, methyl potassium, ethyl potassium, and so forth may be used in this reaction. Also, metal initiators containing a dianion, such as the alkali metal salts of 1,1-diphenylethylene and alpha-methylstyrene tetramer and the radical anion initiators of the sodium naphthalene type, could lead to the formation of the BAB copolymer. Preparation of

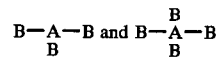

copolymers may be achieved through multifunctional initiators, for example 1,3,5-trilithiocyclohexane and 1,4,7,10-tetrapotassiodecane. It is understood in anionic polymerization that each molecule of the initiator starts one anionic polymer chain; it is also understood that a multiple anion can permit addition of a second polar block on the A polymer.

The anionic polymerization reaction is carried out in the presence of either a polar or nonpolar solvent. Suitable solvents include hexane, heptane, octane, benzene, toluene, xylene, tetrahydrofuran, ethyl ether, methyl ethyl ether, 1,4-dioxane, and other alkanes, ethers and aromatic solvents, oils and mixtures thereof. Tetrahydrofuran is the preferred solvent, since it is an excellent solvent for both polymerization steps in this invention.

In the preparation of polystyrene, styrene is dissolved in solvent and polymerized in the presence of from $10^{-1}$ to $10^{-4}$ mole of anionic initiator per 100 grams of the styrene. Also useful in this phase of the invention are alpha-methyl styrene, methyl styreene, propylstyrene, n-butylstyrene, i-butylstyrene, t-butylstyrene, n-amylstyrene, i-amyl-styrene, hexylstyrenes, heptylstyrenes, methylpropylstyrene, and the like. Styrene is the most preferred in this invention because of cost. Polymerization is carried out for sufficient period of time to provide a block of polystyrene until no further polymerization occurs. Molecular weights in this first step may range from 1,000 to over 250,000. The final group on the living polymer consists of —OM derived from the organometal initiator, "M" being the metal symbol. It is understood that this group, block A, permits addition of the polar block B in the subsequent polymerization step. The term "living polymer" is meant to indicate that the polymerization reaction involving styrene (and also the diene-styrene copolymer) has no termination step and may continue until no further monomer remains. One polymer chain starts with each equivalent of the initiator and uses up available monomer until depletion thereof. Control of molecular weight is achieved by adjustment of styrene/initiator ratio.

To illustrate the polymerization of the diene and styrene copolymers, the following description will refer to the butadiene-styrene system as representative of this aspect of the invention. This polymerization may be carried out either in a random or a block polymerization. The random copolymer is preferred in this invention. For this purpose, a randomizing agent is added to the polymerization reaction mixture. Suitable randomizers include: ethers, such as diethylether, dimethoxyethane, bis(2-methoxyethylether), 1,2-bis(methoxyethoxy)ethane and tetrahydrofuran. Other randomizing agents include the alkali metal salts of $C_1$ to $C_{20}$ alcohols or phenols, e.g. potassium t-butoxide or potassium t-amyloxide. Other agents are phosphite triesters, such as tributyl phosphite, tri-substituted triazines, dimethyl pyridine, potassium acetonyl or potassium or sodium metals. Such dienes as preferably butadiene and isoprene, and also 2,3-dimethylbutadiene, 2,3-diphenylbutadiene, and others of the structure

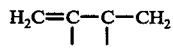

the dangling valences being substituted by hydrogen or alkyl or aryl groups of $C_1$ to $C_{10}$, and styrene provide suitable copolymers in this aspect of the invention.

Upon completion of the polymerization of the butadiene and styrene, since there are vinyl groups remaining in the molecule which could become oxidized or susceptible to other forms of deterioration during use, it is desirable to terminate the initial copolymerization by adding a small amount of the polar compound of block B, such as ethylene oxide, followed by a small amount of a mineral acid or acetic acid and subjecting it to hydrogenation or by hydrogenating first and then acidifying to remove any remaining unsaturation.

Hydrogenation is carried out in the presence of a heterogeneous or homogeneous hydrogenation catalyst. Heterogenereous catalysts include metals of the platinum series, e.g. platinum, palladium and the like, iron, cobalt, or nickel, particularly Raney nickel. The catalyst metals may be used alone or on a carrier, such as charcoal, silica, alumina clays and the like. Nickel supported on kieselguhr is one of the preferred catalysts herein. Homogeneous catalysts include organic salts of these metals, such as nickel acetylacetonate, nickel, diisopropylsalicylate, nickel naphthenate, nickel octoate, and nickel ethyl hexanoate. Homogeneous catalysts also include tris(triphenyl)phosphine rhodium chloride and other group VIII metal compounds, particularly a compound obtained by reacting an aluminum trialkyl with a nickel or cobalt organic salt, such as aluminum triisobutyl with nickel naphthenate or 2-ethylhexanoate.

The butadiene-styrene copolymer may contain from 1% to 70% by weight of styrene, most preferably between 1% and 25% styrene is present. The hydrogenation catalyst is present in the amount of from about 0.0005% to about 10% by weight of the polymers, preferably 0.005% to about 5%. The lower concentrations are desirable for homogeneous catalysts; the upper limits are for heterogeneous catalysts. U.S. Pat. No. 3,294,768 discloses a number of catalysts useful in forming random butadiene-styrene adducts and are similar to the aforementioned initiators of the $RM_y$ formula.

The next step in formation of the block copolymers of this invention is to react block A polymer, either the polystyrene (PS) or the hydrogenated butadiene-styrene copolymer (HBDS), with the polar compound. In the first case, the alkylene oxide or sulfide is added directly to the PS solution. In the latter case, the HBDS copolymer is preferably retained in the hydrogenated reaction mass, although it may be separated therefrom and redissolved in a solvent. A catalyst for the alkylene oxide polymerization is added to the HBDS solution. Such catalysts include: potassium t-butoxide, potassium t-amyloxide, potassium hydroxide. The number of moles of catalyst would be approximately the same as that used for the anionic initiator. The alkylene oxide is then added to the HBDS solution. The amount of alkylene oxide added to the solution is from 1% to 50%, and preferably from 5% to 25%, by weight of the polymer. Ethylene oxide is the most preferred monomer for reasons of cost, availability and performance characteristics. The carbon atoms attached to the oxygen atom are vincinal and each of these carbon atoms may be substituted by other carbon atoms, the total number of carbon atoms preferably ranging from 2 to 5. Therefore, also suitable would be 1,2-propylene oxide and 1,2-butylene or 2,3-butylene oxides and the like or their mixtures. Also of interest are diepoxides such as the methylenebus(phenols).

The living PS polymer of HBDS copolymer is reacted with the polar compound which adds oxylakylene or thioalkylene groups at the metaloxy or metalthio terminus, —$CH_2$—$CH_2$—OM or —$CH_2CH_2$—SM, to produce AB block copolymers having at least 2 and up to about 6,000 such polar groups.

Schematic structures may be illustrated as follows:

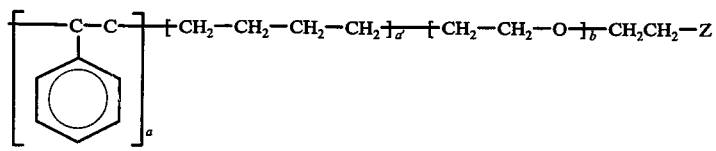

or

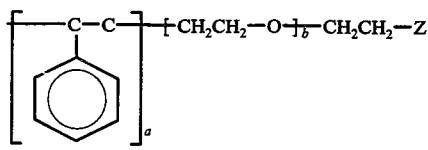

$a$, $a'$ and $b$ are integers of at least 2 and Z is the capping group. Thus, the block copolymers used as precursors in this invention consist essentially of polymerized styrene-type block having an average molecular weight of between 1,000 to about 500,000 and a polar portion, preferably polypoxyalkylene, having from 2 l up to about 6,000 units, preferably 10 to 1,000 units. Preferred molecular weights of the copolymer of this invention may range from about 1,000 to about 3,000 but will preferably range from 10,000 to about 200,000.

The polar block B may, if desired, be terminated either by precipitating the copolymer in a lower alkyl alcohol, i.e. from 1 to 5 carbon atoms, such as methanol, or by reacting with a compound containing a carbonyl group, such as an organic acid, an isocyanate or a carbonyl halide, such as cyanuric chloride and phosgene, and then either precipitating the resulting reacted polymer or, by our preferred method of replacing the solvent (other than oil) with an oil including petroleum or synthetic oil, e.g. ester, ethers, polyolefins, etc. The end or capping group, Z above, may be hydroxy, metaloxy of the alkali metals, or —OR″ or

R″ being being alkyl or aryl of from 1 to 10 carbon atoms or a heterocyclic nitrogen group of pyridines, pyrimidines or triazines. The preferred capping group is prepared by reacting the polymer with an isocyanate, alkyl isocyanate or preferably an aromatic diisocyanate, such as toluene diisocyanate (TDI), to form the mono- or the diisocyanate, or urethane-type, group

at the end of the block copolymer, wherein R‴ may be alkyl or aryl and may contain an O═C═N— group, such as phenyl, tolyl, phenylene isocyanate or tolylene isocyanate. With the preferred diisocyanate, the second O═C═N— group may either remain unreacted or reacted with other compounds, such as antioxidants derived from phenol or aryl amines, or may even be used to cap a second copolymer chain, for example AB-TDI-BA. This cap provides unusually excellent thermal and oxidative stability to the polymer during use. It is usually in the form of an anion with the alkali metal of the initiator,

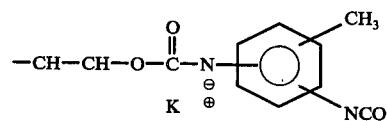

using potassium as the preferred example. Other capping groups consist of hydroxy or metaloxy derived from the metal of the anionic initiator, or another metal substituted by exchange reaction, or from cyanuric halide, dihalopyrimidine, halopyridine, and the like or halocarbonyl. These polyfunctional capping agents may also couple more than one AB polymer molecule, as TDI above.

The styrene polymerization reaction may be conducted at a temperature in the range of from −80° C to 100° C, but ordinarily room temperature is the desired maximum. The reaction may be terminated within a period of from 15 minutes to over about 4 hours. The second reaction with alkylene oxide may be conducted at a temperature of from 0° C up to about 175° C, and the time of reaction may range from about half an hour to about 24 hours. The products are removed by filtering the precipitated copolymer from the solvent or as preferred by adding a hydrocarbon oil (in which the copolymer can be used) or a process oil and removing the more volatile solvent by stripping or other known means. Should a capping group other than —OM be desired, the reactant providing the group is added to the reaction mixture prior to such separation and the mixture is heated. For example, as previously discussed, the addition of toluene diisocyanate to the reaction product would yield a TDIK end group (wherein M is potassium). Any metal halide or oxide side product resulting from the capping reaction may be removed by washing and/or filtration. In the scope of this invention, the retention of metals may be preferable.

These polymers are then subjected to alkylation or hydrogenation or both in any desired combination of steps.

With regard to the polystyrene-alkylene oxide block copolymer, this material is normally so insoluble in oil or other petroleum based fluid or other organic medium as to be of little utility for VI improvement, emulsification or dispersancy. The copolymer is reacted with an olefin, an alcohol or an alkyl halide in the presence of a Friedel-Crafts catalyst. The alkylating material may have from 4 to 30 carbon atoms and includes, for example butene-1, isobutylene, amylene, hexene octene, decene, undecene, dodecene, octadecene, eicosene, tricosene; butyl halide, amyl halide, hexyl halide, cydohexyl halide, octyl halide, decyl halide, dodecyl halide, octadecyl halide; and butyl alcohol, isobutyl alcohol, amyl alcohol, hexyl alcohol, cyclohexanol, octyl alcohol, capryl alcohol, decyl alcohol, myristyl alcohol, and the like.

The two reactants are mixed together, in a suitable solvent if desired, such as cyclohexane, hexane, dichloroethylene, and the like in the presence of a small amount of catalyst. Commonly used Friedel-Crafts catalysts include, for example, aluminum chloride or other halide, boron trifluoride, sulfuric acid, hydrofluoric acid and hydrochloric acid. With olefins, faster rates of alkylation are obtained with a Friedel-Crafts catalyst (e.g., $AlCl_3$) and catalytic amounts of HCl gas. The alkylation reaction is carried out at temperatures ranging from 0° C to 125° C, preferably 0° to 50° C.

The resulting alkylated styrene-alkylene oxide copolymer is completely soluble in lubricating oil or other organic base medium. It is understood that the alkyl group is attached in the ortho and para positions to the polymer chain substituent on the phenyl group. Moreover, the final reaction mixture may consist of copolymers in which a portion of the phenyl groups are not alkylated. The degree of alkylation will of course depend on the ratio of the moles of alkylating agent per mole of styrene used in preparing the copolymer precursor. In this invention, from 0.25 to 10 moles of agent per mole of styrene is used and preferably from 0.5 to 5.

Alkylation of the HBDS-alkylene oxide copolymer may also be carried out under the same conditions as with the PS-copolymer. The HBDS-copolymer is normally soluble in petroleum fluids. However, when the butadiene reactant contains a high proportion of the 1,4-isomer or if a high percent of styrene is employed in preparing block A, alkylation is desirable to increase the solubility.

Also useful precursors in this phase of the invention are styrene copolymers which already contain alkyl groups. Ring-substituted styrene, such as methyl styrene (vinyl toluene), ethylstyrene, propylstyrene, i-propylstyrene, butylstyrene, i-butylstyrene, t-butylstyrene and the like containing up to 10 carbon atoms in the alkyl substituent may be used in preparing the copolymer. Further alkylation of the block copolymer intermediate would attach a second alkyl group. Very often, alkylated styrenes are not commercially available and hence soluble block copolymers could not otherwise be prepared. Using the method of this invention, such insoluble styrene-alkylene oxide copolymers can be alkylated to produce useful additives for industrial fluid compositions.

Alternatively, the starting block copolymer may be hydrogenated using techniques similar to those described previously. The copolymer alone or in a suitable solvent is hydrogenated in the presence of the hydrogenation catalyst, preferably one of the nickel catalysts, such as nickel on Kieselguhr or nickel octoate. This reaction is carried out at a temperature of from 150° C to about 400° C and hydrogen pressure of from 800 to 3000 psi, preferably 1200 to 2000. The hydrogenation of the HBDS prior to copolymerization with the polar reactant is understood to remove unsaturation only. In this alternative post-polymer hydrogenation, phenyl groups are converted to cyclohexadienyl, cyclohexanyl and cyclohexyl groups, depending on the degree of hydrogenation desired. The final product may consist of a mixture of phenyl and cyclohexyl groups in the copolymer chain.

As a further modification of this invention the starting block copolymer may be subjected to both alkylation and hydrogenation. By varying the level of alkylation and hydrogenation, the extent of these treatments may be minimized to achieve the desired solubility without loss of VI improvements.

It has been found that hydrogenation of the block copolymer may result in some loss of alkylene oxide. Accordingly, copolymer precursors having higher alkylene oxide levels than desired in the final hydrogenated product should be used. This effect of reducing block B is substantially reduced by capping the precursor with a group other than hydroxy. Preferred capping groups are the isocyante and heterocyclic nitrogen groups, particularly the aromatic diisocyanate group such as TDI.

The products of this invention are multifunctional additives for industrial and other organic fluids. Because of the high molecular weight and narrow molecular weight distribution of these copolymers, they provide high viscosity index and shear stable oil compositions which may perform as cross-graded lubricants, diesel oils and greases. Thus, the oil compositions of this invention may be used both under high and low temperature conditions, since the higher the viscosity index the more stable the viscosity flow at extreme temperatures. The products of this invention may also be used in non-petroleum lubricants such as ester lubricants, polyphenyl ethers, polyolefinic fluids and the like. Greases and petroleum fuels may also be blended with these products.

These modified copolymer additives are also believed useful in thickening the base fluid medium. Of particular interest are gasoline and fuel oil which would have improved detergency as well as lower fuel consumption. The molecular weight distribution (Mw/Mn) of the copolymer precursor, wherein Mw is the weight average molecular weight and Mn is the number average molecular weight, is generally in the range of about 1 to 7, and usually 1 to 2.

Another valuable function performed by the modified copolymers of this invention, both high and low molecular weight copolymers, is their ability to disperse particles in the lubricant and to prevent them from becoming deposited on engine surfaces. It is believed that the combination of oil soluble and polar portions of the macromolecule permits the polymer both to remain dissolved in the oil and yet hold particles dispersed in the oil. These two characteristics are necessary to keep the oil free of deposits affecting engine performance. Mixed modified copolymers of different molecular weights or of different A blocks or of different degrees of alkylation or hydrogenation in the fluid medium may be used for a variety of functions.

The additives of this invention may be used in conjunction with other additives normally used in lubricants and fuels, such as basic alkali or alkaline earth metal sulfonates and phenates, $C_{20}$ - 300 alkenylsuccinic acid imides of ethylene polyamines, such as tetraethylene pentamine, esters of mono and polyhydric alcohols, such as pentaerythritol, or alkali and alkaline earth metal, the polymethacrylates, sulfurized olefins such as isobutylene, and phosphites, dithiophosphates, carbamates and the like.

The following examples illustrate the manner of preparing the block copolymers of this invention and the evaluation of such copolymers in organic industrial liquid compositions. The molecular weight measurements given in these examples were obtained by gel permeation chromatography in tetrahydrofuran.

EXAMPLES

Examples 1 to 5 illustrate the method of preparing the block copolymer starting materials:

EXAMPLE 1

Into a 2000-ml 4-necked flask was distilled 1000 ml of dried tetrahydrofuran (THF) under vacuum at −78° C. Nitrogen gas was passed through the reactor. The THF was treated with about 30 drops of 0.5 M solution of cumyl potassium in THF. Then 6.6 ml of the 0.5 M cumyl potassium solution were added to the reactor. To the solution was added 80 grams (0.5 mole) of styrene through a dropping funnel at −78° C. The polymerization was allowed to proceed at this temperature for approximately one hour. To the resulting reaction mixture was added 20 grams (0.45 mole) of ethylene oxide which had been dried over calcium hydride. The reaction mixture was allowed to react without temperature control and proceed at room temperature for sixteen hours. The reaction was terminated by adding to the resulting copolymer 2 ml of methanol. The product is an AB block polymer having the following characteristics:
$M_n = 20,850$
$M_w = 28,040$
$M_w/M_n = 1.35$

EXAMPLE 2

Using a procedure similar to that of EXAMPLE 1, styrene and ethylene oxide were copolymerized to form an AB block polymer, except that 40 grams (0.25 mole) of styrene was polymerized in the presence of 8.5 ml of 0.6 M cumyl potassium solution in THF and 10 grams (0.227 mole) of ethylene oxide was copolymerized with it.

EXAMPLE 3

Into a 2000 ml flask, 300 ml of hexane was added under a nitrogen blanket. Into the flash was distilled under vacuum at −78° C 150 grams (2.5 moles) of purified butadiene followed by a solution of 50 grams (0.48 mole) of styrene in 800 ml of benzene. The reaction flask, still under a nitrogen blanket, was allowed to warm to room temperature. To the reaction flask was then added 100 ml of a 0.31 M solution of n-butyl lithium containing 0.384 grams of potassium t-butoxide. The reaction flask was maintained at room temperature for 16 hours following this addition during which time polymerization occurred. The polymerization was terminated by the addition of 0.6 gram of ethylene oxide and 2 ml of glacial acetic acid, and the polymer was removed by filtration.

A solution of 105 grams of the resulting polymer in 370 ml of benzene was subjected to hydrogenation by adding 15 grams of a catalyst consisting of 10% by weight of palladium on charcoal and passing hydrogen gas through the reactor at 80° C and 400 psi for 16 hours. The catalyst was filtered off from the polymer solution. To the filtrate was added 0.704 gram of potassium t-butoxide under a nitrogen blanket and the solution was heated to reflux; 40 ml of benzene was distilled off. To the resulting solution was added 18 grams (0.4 mole) of ethylene oxide by distilling in the ethylene oxide under vacuum. A nitrogen atmosphere was then applied, and the reaction allowed to proceed at 78° C for five hours. After polymerization of the ethylene oxide was completed, 70 grams of a process oil was added and the benzene stripped off under vacuum.

The resulting polymer now in the oil solution had the following properties:
$M_n = 3,100$
$M_w = 19,100$
$M_w/M_n = 6.2$

EXAMPLE 4

A copolymer was prepared using the same procedure as in Example 1, except that only 10% of the ethylene oxide based on total monomers was used. To the resulting polymer solution was added 0.9 gram (6 × 10⁻³ mole) of toluene diisocyanate (TDI) at a temperature of 25° C. The end group in this polymer consists of anionic urethane-potassium group having a free isocyanate group. The molecular weight analysis of the product is as follows:
$M_n = 9,300$
$M_w = 15,800$
$M_w/M_n = 1.7$

EXAMPLE 5

A copolymer prepared as in the preceding examples having an OK end group was reacted with amino dichloropyrimidine leaving an amino-pyrimidinyl end group. The molecular weight analysis is as follows:
$M_n = 6,500$
$M_w = 9,700$
$M_w/M_n = 1.5$

EXAMPLE 6

A styrene-ethylene oxide block copolymer prepared in a manner similar to that of Example 1 was used in this example. In a suitable reactor 10 grams of this copolymer having a molecular weight ($M_w$) of 28000 was mixed with 200 ml of dichloroethylene. To the mixture was added 1 gram of aluminum chloride and to this was added 20 g of tert-butyl chloride over a period of 1 hour. Added to the resulting mixture with stirring was 2 grams AlCl₃. The mixture was stirred for 4 hours at 30° C. The catalyst was decomposed and the oil soluble polymer was extracted using cyclohexane. The cyclohexane extract was dried and the solvent was removed, leaving about 18 g of polymer. IR analysis showed about 50% dialkylation.

EXAMPLE 7

A t-butylstyrene-ethylene oxide block copolymer prepared in a manner similar to that of Example 1 was used in this example. In a suitable pressure vessel, 5 grams of the said copolymer in 500 ml of cyclohexane was heated to about 200° C and 1 gram of nickel metal on Kieselguhr was added. Hydrogen gas at 1800 psi was introduced subsurface for 3 hours. Afterward, the reaction mixture was cooled and filtered. The polymer product was recovered after evaporation of the cyclohexane. Infra-red analysis of the product showed peaks indicating that it contained about 50% phenyl groups and 50% cyclohexyl groups.

EXAMPLE 8

The styrene-ethylene oxide block copolymer used in Example 6 was hydrogenated by adding 5 grams of the copolymer and 500 ml of benzene to a pressurizable vessel and 6 grams of nickel on Kieselguhr was added. The mixture was heated to about 200° C and hydrogen gas at 1800 psi was introduced subsurface. The gas feed was maintained for 4 hours. The reaction mass was then cooled and filtered. Infra-red analysis of the polymer product obtained after evaporation of the benzene showed peaks indicating that it contained 10% phenyl groups and 90% cyclohexyl groups.

EVALUATION OF PRODUCTS

A solvent refined SUS mineral oil was measured for viscosity index. To the oil were added the products of this invention to show VI improvement. The results are as follows:

| Oil Additive | Conc, by Wt. | Kinematic Viscosity (cs) | | | |
|---|---|---|---|---|---|
| | | 100° F | 210° F | VI | CCSP |
| None | — | 32.00 | 5.21 | 102 | 12.5 |
| Product of Ex. 6 | 0.5 | 35.19 | 5.67 | 110 | 13.1 |
| Product of Ex. 7 | 0.5 | 34.96 | 5.69 | 112 | 13.0 |
| Product of Ex. 8 | 0.5 | 36.10 | 5.89 | 116 | 13.5 |
| Product of Ex. 8 | 1.0 | 39.44 | 6.43 | 123 | 14.0 |
| Comparison Product of Ex. 1 | Insoluble | No measurement | | | |

This invention describes a process and products and compositions derived therefrom. Nothing in this description shall be deemed a limitation of the invention except as claimed in the following claims. We claim:

1. A novel copolymer having improved solubility in organic fluids prepared by the step comprising alkylating an AB or BAB block copolymer precursor in which block A is a styrene-containing polymer and block B is an alkylene oxide or alkylene sulfide polymer.

2. The novel copolymer of claim 1 wherein block A of the copolymer precursor is a homopolymer of styrene.

3. The novel copolymer of claim 1 wherein block A of the copolymer precursor is a hydrogenated diene-styrene copolymer.

4. The novel copolymer of claim 3 wherein the diene is butadiene.

5. The novel copolymer of claim 1 wherein block B is an alkylene oxide copolymer.

6. The novel copolymer of claim 5 wherein the alkylene oxide is ethylene oxide.

7. The novel copolymer of claim 1 wherein the alkylation step is carried out by reacting the copolymer precursor with an olefin, an alkyl halide or an alcohol having from 4 to 30 carbon atoms.

8. The novel copolymer of claim 7 wherein the olefin is isobutylene.

9. A process for preparing the novel copolymer of claim 1 by mixing the copolymer precursor with as alkylating agent an olefin, alkyl halide or alcohol having from 4 to 30 carbon atoms in a ratio of from 0.25 to 10 moles of said alkylating agent per mole of styrene used in the copolymer precursor in the presence of a Friedel-Crafts catalyst.

10. A process of claim 9 wherein the alkylating agent is isobutylene.

11. A process for preparing the novel copolymer of claim 1 by hydrogenating the copolymer precursor at a pressure of from 800 to 3000 psi.

* * * * *